United States Patent [19]

ap Rhys

[11] 4,121,209
[45] Oct. 17, 1978

[54] TWO-AXIS MOTION COMPENSATION FOR AMTI

[75] Inventor: Tomos L. ap Rhys, Ellicott City, Md.

[73] Assignee: The United States of America as represented by the Secretary of the Navy, Washington, D.C.

[21] Appl. No.: 843,905

[22] Filed: Oct. 20, 1977

[51] Int. Cl.² ........................... G01S 9/42; G01S 9/02
[52] U.S. Cl. .................................. 343/7.7; 343/16 R; 343/100 SA; 343/854
[58] Field of Search ............... 343/100 SA, 16 R, 7.7, 343/854

[56] References Cited

U.S. PATENT DOCUMENTS

| | | | |
|---|---|---|---|
| 3,364,490 | 1/1968 | Hannan | 343/854 |
| 3,380,053 | 4/1968 | Connolly | 343/16 R |
| 3,438,030 | 4/1969 | Dickey, Jr. | 343/7.7 |
| 3,480,958 | 11/1969 | Tcheditch | 343/16 R |
| 3,806,924 | 4/1974 | Applebaum | 343/7.7 |
| 3,893,117 | 7/1975 | Nirasawa | 343/7 A |

*Primary Examiner*—S. C. Buczinski

*Attorney, Agent, or Firm*—R. S. Sciascia; Philip Schneider; William C. Daubenspeck

[57] ABSTRACT

A displaced-phase-center antenna technique which compensates accurately for the motion of an airborne radar system in both the boresight direction of the antenna and in the direction normal to the boresight. An antenna system comprising a broadside array of endfire arrays forms four receive beams which are displaced from each other in both the boresight direction and in the direction normal to the boresight. These four beams are used to produce signals which correspond to signals from two receive beams with phase centers having a separation equal in magnitude and direction to the aircraft's motion during the interpulse period. A signal scattered from a fixed object on a first transmitted pulse and received in one of the two receive beams will have the same phase characteristic as a signal scattered from the same fixed object on a subsequent pulse and received in the other receive beam. Upon proper delay of the first received signal, the returns from the fixed object may be cancelled.

11 Claims, 7 Drawing Figures

TWO-AXIS MOTION COMPENSATION FOR AMTI

BACKGROUND OF THE INVENTION

This invention relates in general to radar systems and especially to radar systems of the moving-target indication-type (MTI). More particularly, the present invention relates to arrangements which compensate for relative motion between fixed objects and an airborne radar system to provide improved cancellation of the signals from the fixed objects.

A coherent MTI radar system uses the phase characteristic present in the backscattered radar pulse to distinguish between the returns from moving targets and those from stationary objects or clutter. When the radar is fixed in space, the phase relationship existing at the radar receiver between the transmitted pulses and the backscattered pulses from a fixed object is the same for successive pulses whereas the phase relationship of the backscattered pulses from a moving target is continually changing. This variation in relative phase between the transmitted pulses and their corresponding returns from a relatively moving target, as contrasted with the unchanging phase of returns from a relatively fixed target, provides a means of distinguishing between stationary and moving targets. However, in an airborne moving-target-indication (AMTI) radar system, the clutter sources move relative to the radar platform so that the relative phase of the backscattered signals originating from them varies from pulse to pulse.

The relative displacement of the radar antenna with respect to a particular clutter scatterer depends on the velocity of the aircraft and the direction of the scatterer relative to the velocity vector of the aircraft. In general, the velocity of the aircraft has a component that is in the direction that the antenna is pointing (parallel to the antenna's boresight direction) and a component that is normal to this direction. Each component produces different effects which complicate clutter cancellation. The velocity component parallel to the antenna boresight direction primarily causes the center frequency of the clutter to vary with range and azimuth, while the velocity component normal to the antenna's boresight direction causes the clutter power spectrum to be spread as a function of the aircraft velocity and the antenna's beamwidth. When the antenna is pointing fore or aft, the variation of the centroid of the clutter predominates; when the antenna is pointing abeam, the velocity spread across the antenna's beamwidth is more important. At intermediate pointing angles, both spreading and variation of the centroid occur due to the aircraft's motion.

In the past, one method of compensating for the motion normal to the antenna's boresight direction has been to use antenna systems in which the antenna's phase center may be physically or electronically displaced along a plane that is normal to the antenna's boresight direction. The phase center of an antenna beam is the point about which rotation of the pattern will produce the minimum change in the far field pattern or, in effect, the point in space from which the beam appears to emanate. By this technique, known as displaced phase center antenna (DPCA), one radiation pattern, corresponding with one transmission-reception cycle, effectively occupies the same position in space as did another pattern an interpulse period before so that the component of motion normal to the boresight direction is effectively cancelled out as far as returns from fixed objects are concerned. U.S. Pat. No. 3,438,030 by Frank R. Dickey, Jr. and U.S. Pat. No. 3,806,924 by Sidney P. Applebaum are examples of motion compensation arrangements employing antenna systems (a monopulse horn antenna in the former and a linear broadside array antenna in the latter) in which the phase center may be shifted in the plane normal to the antenna's boresight direction. In this type of system, the component of motion parallel to the antenna's boresight direction is dealt with by offsetting the frequency of the return signal by an amount equal to the average doppler frequency of the clutter spectrum. Because the center frequency of the clutter varies with range as well as azimuth and the open- or closed-loop techniques used to determine the doppler-offset frequency are too slow to allow correction for all ranges in a particular sweep, it has been the practice to determine the doppler shift at one particular range and use this value for all ranges. This results in a peak error which has been a prime limitation in the performance of this type of system.

In another approach to the motion compensation problem, the aperture of an array antenna is aligned along the ground track so that the component of motion parallel to the boresight direction is eliminated. The elements of the array are grouped so as to create two antennas displaced by an amount close to the nominal interpulse movement. This displacement is then made exact by varying the pulse repetition frequency so that the interpulse movement corresponds with the antenna separation. This has the advantage of giving a wide angle correction but has the disadvantage of requiring the pulse repetition frequency to be set by the antenna platform parameters. Since the antenna does not rotate through 360°, this arrangement provides no coverage in the direction of the aircraft's motion.

SUMMARY OF THE INVENTION

It is therefore an object of the present invention to provide an improved arrangement for compensating for the motion of an airborne moving-target-indication radar system to permit improved cancellation of fixed targets.

Another object is to provide an improved arrangement for compensating for both the component of motion parallel to the antenna's boresight direction and the component of motion normal to this direction in an airborne moving-target-indication radar system.

Another object is to provide a DPCA arrangement in which the phase center of the antenna system may be electronically displaced in both the antenna's boresight direction and the direction normal to this direction in accordance with the antenna's motion.

Briefly, the present invention compensates for the change in phase in signals scattered from fixed objects due to the motion of the aircraft by creating two receive beams spaced apart the proper distance both parallel to and normal to the antenna's boresight direction. To accomplish this, it is necessary to vary the effective phase centers of the antenna's beams in accordance with the velocity of the aircraft and the boresight direction of the antenna with respect to the velocity vector so that a signal scattered from a fixed object from a first transmitted pulse has the same phase characteristic as a signal scattered from the same fixed object on a subsequent pulse. The preferred embodiment includes an antenna system consisting of a broadside array of endfire arrays. The elements of each endfire array are grouped to form two endfire sub-arrays with phase centers that are spaced apart in the boresight direction. The more forward (relative to the antenna boresight direction) of the endfire sub-arrays are then grouped to form two broadside sub-arrays which have phase centers spaced apart in the direction normal to the boresight direction. The more aft of the endfire sub-arrays are similarly grouped to form two more broadside sub-arrays. The resulting four broadside sub-arrays are used to create the two receive beams spaced apart in accordance with the aircraft's motion to permit cancellation of signals scattered from fixed targets.

Other advantages and novel features of the invention will become apparent from the following detailed description of the invention when considered in conjunction with the accompanying drawings wherein:

DESCRIPTION OF THE PREFERRED EMBODIMENT

Figure 1:
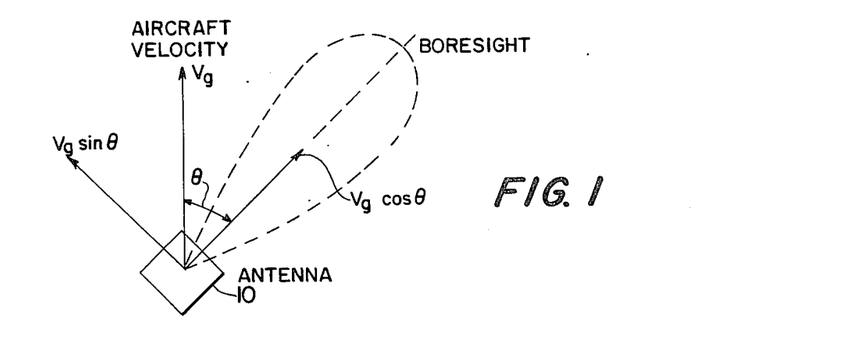
FIGS. 1 and 2 are diagrammatic illustrations useful in explaining the physical principles involved in the present invention.

Referring now to FIG. 1, the horizontal motion of an airborne rotating antenna 10 with respect to a fixed object or clutter has a component in the direction the antenna is pointing (the antenna's boresight direction or centerline direction) and a component normal to this direction. These components are $V_g \cos\theta$ and $V_g \sin\theta$, respectively, where $V_g$ is the aircraft's ground speed and $\theta$ is the angle between the boresight direction and the aircraft's ground track. Hereinafter, the motion of the antenna in the direction of the antenna's boresight is also referred to as longitudinal motion and the motion normal to this direction is referred to as transverse motion. The present invention uses a DPCA approach which compensates for the motion of the antenna in both directions.

Figure 2:
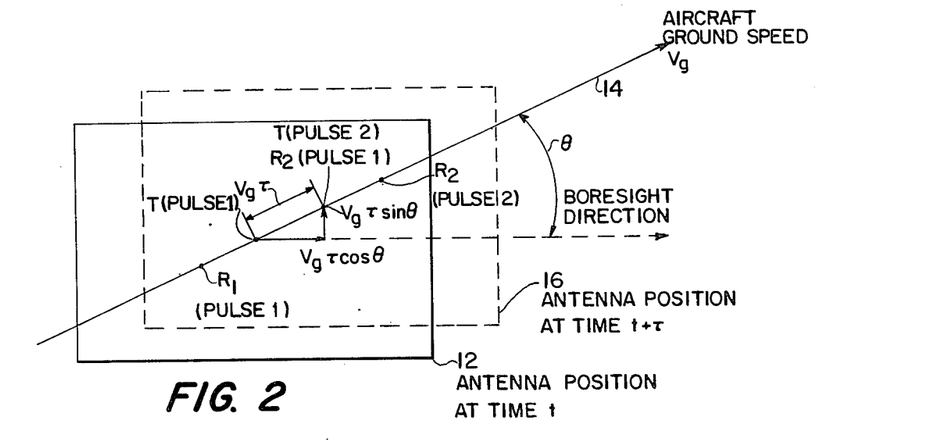

Reference is now made to FIG. 2 to illustrate the concept of two-axis motion compensation (i.e., compensation for longitudinal motion along the boresight and compensation for transverse motion normal to the boresight) of the present invention. The rectangle defined by line 12 indicates the location in space at time $t$ of a radar antenna having a boresight direction indicated by angle $\theta$ and located on an aircraft moving with a ground speed $V_g$ in a direction indicated by line 14. As is common in DPCA schemes, the phase center of the transmit antenna is fixed with respect to the aircraft in this illustration. In FIG. 2 the transmit phase center is shown as being located at the center of the antenna. This location is not required for operation of the present invention but, as is apparent to a person skilled in the art, is a preferred location because it makes the most effective use of the antenna's aperture (if, as is normally the case, a single antenna is used for both transmission and reception of radar signals). A first pulse is transmitted at time $t$ with the transmit aperture having its phase center at point T. The first pulse, upon striking a fixed object, is reflected and subsequently received in two beam patterns having phase centers located at $R_1$ and $R_2$, where $R_1$ and $R_2$ are on a line parallel to the aircraft's ground track (in the FIG., $R_1$ and $R_2$ are shown as located on line 14). One pulse repetition period later at time $t + \tau$ (where $\tau$ is the interpulse period) the antenna has moved to a location (in space) indicated by dashed line 16. The transmit phase center T and the two receive phase centers $R_1$ and $R_2$ have each moved a distance $V_g\tau$ from their former positions. If the receive beam phase centers $R_1$ and $R_2$ are separated by $2V_g\tau$, a second pulse transmitted from T(pulse 2) at time $t + \tau$, reflected from a fixed obejct, and received at $R_1$ (pulse 2) will have covered the same distance as the first pulse transmitted at time $t$, reflected from the same fixed object and received at $R_2$ (pulse 1). The separation of $R_1$ and $R_2$ by $2V_g\tau$ compensates for the motion of the aircraft since both the transmit phase center and the receive phase centers have moved a distance $V_g\tau$. Because the phase characteristic of the two reflected pulses will be identical, the signals from the fixed object may be cancelled by delaying the first return received at $R_2$ for an interpulse period so that the signals coincide in time as well as in phase characteristic.

It can be seen that the rotation of the antenna changes the angle $\theta$ between the antenna's boresight direction and the aircraft's ground velocity $V_g$. For cancellation of fixed objects, the phase center of the receive beam $R_2$ must be ahead of the phase center of receive beam $R_1$ by $2V_g\tau\cos\theta$ in the boresight direction (to compensate for the longitudinal component of the aircraft's motion) and by $2V_g\tau\sin\theta$ in the direction normal to the boresight direction (to compensate for the transverse component of the aircraft's motion). In FIG. 2, the phase center of receive beam $R_2$ is shown located a distance $V_g\tau$ ahead of the transmit phase center T in the direction of the aircraft's ground track, and the phase center of receive beam $R_2$ is shown located an equal distance behind T. It should be apparent that these locations have been chosen to illustrate the most effective use of the antenna's aperture and are not intended to limit the present invention to the arrangement shown.

Figure 3:
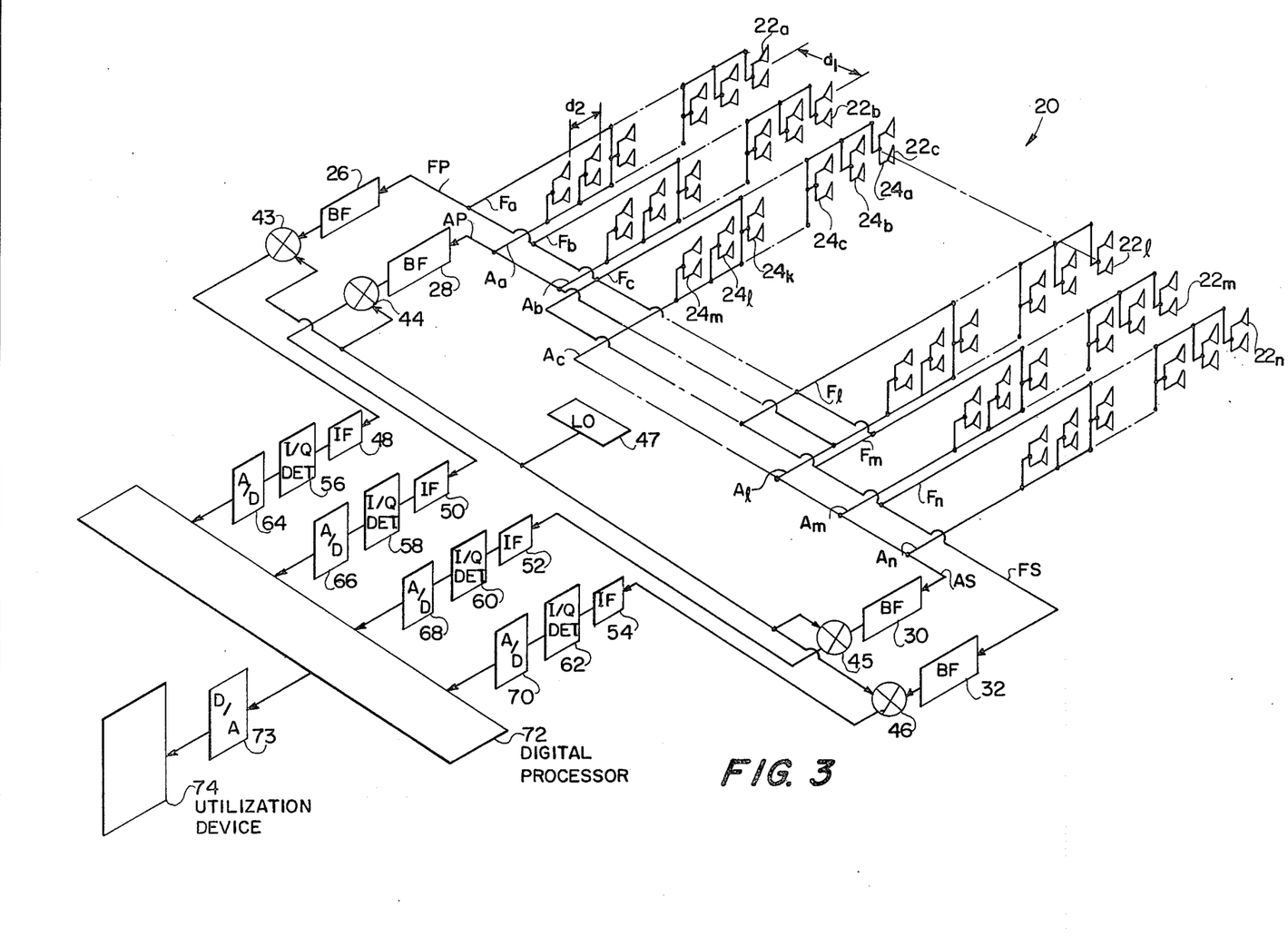
FIG. 3 is a block diagram illustrating the preferred embodiment of the two-axis motion compensation system of the present invention.

FIG. 3 illustrates the preferred embodiment of the present invention. The two-axis motion compensation system includes an antenna system having a transmit beam and four receive beams, the boresight directions of the receive beams being effectively parallel to each other and also parallel to that of the transmit beam. It will be recognized that the transmit antenna may be separated from the receive antenna as long as it is fixed with respect to the aircraft. The antenna system consists of a broadside array 20 of uniformly spaced (separated by distance $d_1$ in the horizontal plane) endfire arrays $22_a$, $22_b$, $22_c$, ... $22_b$, $22_m$, $22_n$. Each endfire array consists of uniformly spaced (separated by distance $d_2$ in the horizontal plane) pairs of receiving elements $24_a$, $24_b$, ... $24_k$, $24_l$, $24_m$ such as slots or dipoles. Although the use of pairs of receiving elements allows greater control of the shape and pointing direction of the elevation pattern, it is noted that single receiving elements may be used within the concept of the present invention.

As will be appreciated by those skilled in the art, the receiving elements 24 may perform both the transmit and receive operations in the preferred embodiment.

The term "broadside array" as used herein refers to an array in which all elements of the array are in-phase so that the direction of maximum radiation sensitivity is orthogonal to the array. The term "endfire array" as used herein refers to an array in which there is a progressive phase delay between the elements nominally equal to the spacing between the elements so that the direction of maximum radiation sensitivity is parallel to the line of the elements. A typical antenna contemplated by the present invention includes on the order of 12 endfire arrays with about 20 (or 20 pairs of) receiving elements in each array. The distances $d_1$ and $d_2$ may be approximately $\lambda$ and $\frac{3}{8} \lambda$, respectively, where $\lambda$ is the wavelength.

The individual pairs of receiving elements 24 are combined in the following manner to form four sub-arrays—a forward-port sub-array FP, a forward-starboard sub-array FS, an aft-port sub-array AP, and an aft-starboard sub-array AS. The pairs of receiving elements $24_a$, $24_b$, $24_c$, ...$24_k$, $24_l$, $24_m$ of each endfire array $22_a$, ...$22_n$ are grouped to form two overlapping endfire sub-arrays—an aft endfire sub-array $A_a$, ...$A_n$ and a forward endfire sub-array $F_a$, ...$F_n$. FIG. 3 shows each forward endfire sub-array $F_a$, ...$F_n$ as including all the pairs of receiving elements except for the two, numbers $24_l$ and $24_m$, at the back of the array and each aft endfire sub-array $A_a$, ...$A_n$ as including all the pairs of receiving elements except for the two, numbers $24a$ and $24b$, at the front. It is noted that this two element separation is by way of example and not intended to limit the present invention.

The forward endfire sub-arrays $F_a$, ...$F_n$ are then grouped to form two overlapping broadside sub-arrays. The forward-port sub-array FP includes all the forward endfire sub-arrays but the two, identified as $F_m$ and $F_n$, on the right of the antenna as viewed in FIG. 3, and the forward-starboard sub-array FS includes all the forward endfire sub-arrays but the two, identified as $F_a$ and $F_b$, on the left. Similarly the aft endfire sub-arrays $A_a$, ...$A_n$ are combined to form two overlapping broadside sub-arrays—the aft-port sub-array AP and the aft-starboard sub-array AS. It is noted that this two-array separation is exemplary and not intended to limit the present invention.

The signals from the four boardside sub-arrays FP, FS, AP and AS are supplied to beam formers 26, 28, 30, and 32, respectively. These beam formers, whose operation is well known form a weighted sum of signals received from the antenna elements to form beams having the desired pattern.

Figure 4:
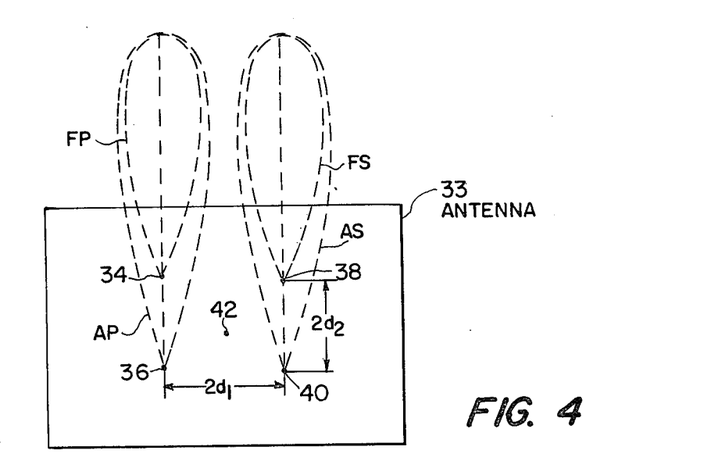
FIG. 4 is a diagrammatic illustration showing the location and orientation of the receive beams formed by the antenna system of FIG. 3.

The connections shown in FIG. 3 produce four beams with identical patterns and having phase centers located as shown in FIG. 4 where 33 indicates the two-dimensional outline of the antenna array 20. Bean FP and beam AP have coincident centerlines and the phase center 34 of beam FP is displaced in the boresight direction from the phase center 36 of beam AP by twice the interelement spacing $d_2$-Beam FS and beam AS have coincident centerlines and their respective phase centers 38 and 40 are displaced from each other by $2d_2$. The phase center 34 of beam FP and the phase center 38 of beam FS are on a line normal to the antenna centerline and are displaced from each other by twice the inter-endfire array spacing $d_1$. Similarly the phase center 36 and 40 of beams AP and AS, respectively, are displaced from each other by $2d_1$. In the preferred embodiment, the transmit-beam phase center is located at 42 in the center of the array.

Referring again to FIG. 3, the RF outputs of beam formers 26–32 are fed to mixers 43, 44, 45, and 46 which have as their other input a signal from a local oscillator 47. The resulting IF signals are amplified in amplifying stages 48, 50, 52, and 54.

In the preferred embodiment the processing of these signals is accomplished by digital means. Therefore, each amplified IF signal is fed to a detector 56, 58, 60, and 62 which supplies the inphase and quadrature components to an analog-to-digital converter 64, 66, 68, and 70 for input to a digital processor 72. Commonly, the analog-to-digital conversion is accomplished at video frequency so that means (not shown) for converting the IF signals to video frequency must also be included.

The digital processor 72, which will be more fully described hereinafter in connection with FIGS. 6 and 7, transforms the four input signals (corresponding to the four receive beams) into the signals which correspond to signals from receive beams having the proper boresight direction and having phase centers which are spaced the proper distance apart to permit cancellation of fixed targets as described in connection with FIG. 2 (that is, beams having phase centers separated by $2V_g\tau$ and lying along a line parallel to the aircraft's ground track). The output of digital processor 72, signals from fixed object having been cancelled, is fed through a digital-to-analog converter 73 and then to a utilization device 74. The later may be a conventional indicator to display uncancelled signals, i.e., signals from moving targets.

The processor 72 shifts the phase centers of the FP sub-array and the AP sub-array to effectively form two new port receive beams having apparent phase centers which are separated by twice the distance the aircraft moves in the boresight direction in the interpulse period (i.e., by $2V_g\tau\cos\theta$) due to the longitudinal component of the aircraft's motion. The phase centers of the FS and AS sub-arrays are similarly shifted to effectively form two new starboard receive beams having phase centers separated by $2V_g\tau\cos\theta$. Then the two new forward beams are combined and the two new aft beams are combined to form two beams having apparent phase centers which are separated by twice the distance the aircraft moves in the direction normal to the boresight direction during the interpulse period (i.e., $2V_g\tau\sin\theta$) and also $2V_g\tau\cos\theta$ in the boresight direction. The resulting forward beam and the resulting aft beam are equivalent to the receive beams $R_2$ and $R_1$, respectively, as described in connection with FIG. 2.

Figure 5:
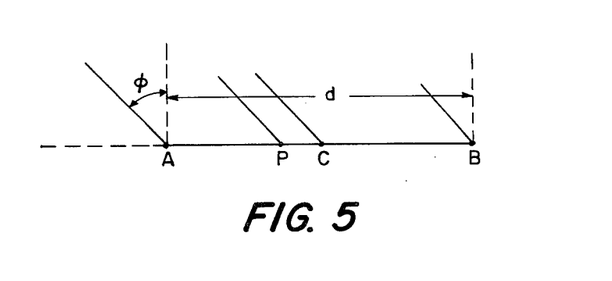
FIG. 5 is a schematic diagram useful in explaining technique used to vary the phase center of the receive beams in the preferred embodiment.

The technique utilized in the preferred embodiment of the present invention to shift the apparent phase center of the sub-arrays may be demonstrated as follows: Consider two coherent point sources, A and B, separated by distance $d$ (with mid-point C) as shown in FIG. 5. Let the amplitude of source A be represented by $(1 + k)$ and that of source B be represented by $(1 - k)$. It is desired to shift the apparent phase center of source A to a point P where $PC/AC = v$. Letting the amplitude of source P be represented by M, $$(1+k) \exp [j \cdot 2\pi/\lambda \cdot d/2 \cdot (\sin\phi - \sin\phi_o)] + (1-k) \exp [-j \cdot 2\pi/\lambda \cdot d/2 \cdot (\sin\phi - \sin\phi_o)] = M \exp [j 2\pi/\lambda \cdot v \cdot d/2 \cdot (\sin\phi - \sin\phi_o)] \quad (1)$$

or $$2 \cos [2\pi/\lambda \cdot d/2 \cdot (\sin\phi - \sin\phi_o)] + 2j k \sin [2\pi/\lambda \cdot d/2 \cdot (\sin\phi - \sin\phi_o)] = M \exp [j \cdot 2\pi/\lambda \cdot v \cdot d/2 \cdot (\sin\phi - \sin\phi_o)] \quad (2)$$

where $\lambda$ is the wavelength, the point sources A and B are phased to give maximum radiation in the direction $\phi_o$, and $\phi$ is the angle of the particular backscatterer under consideration. For the case where point sources A and B have endfire phasing, $\phi_o = \pi/2$. For the case where point source A and B have broadside phases $\phi = 0$.

By equating the real and imaginary parts of equation (2) and solving for $k$, $$k = \frac{\tan[2\pi/\lambda \cdot v \cdot d/2(\sin\phi - \sin\phi_o)]}{\tan[2\pi/\lambda \cdot d/2(\sin\phi - \sin\phi_o)]}$$

On boresight, $\phi \to \phi_o$ so that $k \to v$.

To compensate for the transverse motion of an aircraft antenna (i.e., the component of the aircraft's velocity that is normal to the boresight of the antenna), the apparent phase center of source A (assuming broadside phasing between sources A and B) must be shifted so that $PC = \frac{1}{2} \cdot 2V_g \tau \sin\theta$ where $V_g$ is the aircraft's ground speed and $\theta$ is the angle between the ground velocity vector and the boresight direction of the antenna, and $\tau$ is the interpulse period. The apparent phase center of source B must be shifted an equal distance in the opposite direction. Therefore $$v = \frac{2V_g\tau\sin\theta}{d} \text{ and}$$

$$k_t = \frac{\tan[2\pi/\lambda \cdot V_g\tau\sin\theta \, (\sin\phi - \sin\phi_o)]}{\tan[2\pi/\lambda \cdot d/2(\sin\phi - \sin\phi_o)]}$$

Fixing the value of $k_t$ as that which is optimal on boresight (angle $\phi \to \phi_o$), $$k_{to} = \frac{2V_g\tau\sin\theta}{d}$$

To compensate for the longitudinal motion of the antenna (i.e., the component of the aircraft velocity that is parallel to the boresight of the antenna), the phase center of source A (assuming endfire phasing between sources A and B) must be shifted so that $PC = \frac{1}{2} \cdot V_g \tau\cos\theta$, where $V_g\cos\theta$ is the component of the aircraft's ground speed parallel to the boresight direction of the antenna. Of course, the apparent phase center of source B must be shifted an equal amount in the opposite direction. Therefore $$\mu = \frac{2V_g\tau\cos\theta}{d} \text{ and}$$

$$kl = \frac{\tan[\pi/\lambda \cdot V_g\tau\cos\theta \, (\sin\phi - \sin\phi_o)]}{\tan[2\pi/\lambda \cdot d/2 \cdot (\sin\phi - \sin\phi_o)]}$$

Fixing the value of kl as that which is optimal on boresight (angle $\phi \to \phi_o$), $$k_{lo} = \frac{2V_g\tau\cos\theta}{d}$$

The dependence of $k$ on angle $\phi$ means that, in general, there is no value of $k$ which will give complete correction for all values of $\phi$. When the value $k_o$ is selected, then the performance deteriorates with increasing angle from boresight. The amount of this deterioration depends on the value of $(V_g\tau/d)$. There is a local maximum in performance when $V_g\tau = d/2$ and a monotonic decay in performance as $V_g\tau$ increases beyond this value. In an array, further local maxima can be inserted by working between phase centers spaced by two or more interelement spacings. These occur for $V_g\tau = d, 3d/2, 2d$, etc.

Figure 6:
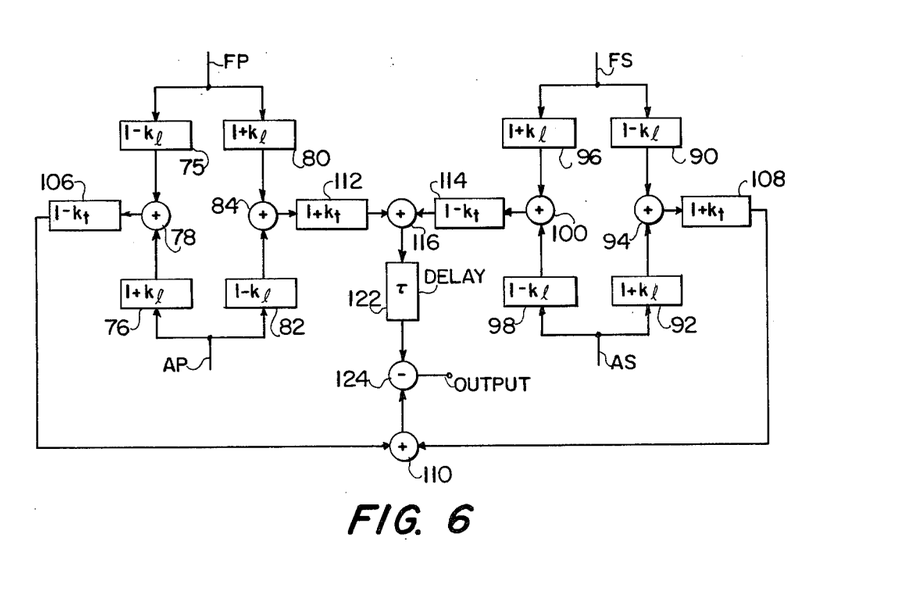
FIGS. 6 and 7 are a block diagram and a diagrammatic drawing, respectively, illustrating the precessing of the receive beams in the preferred embodiment.
Figure 7:
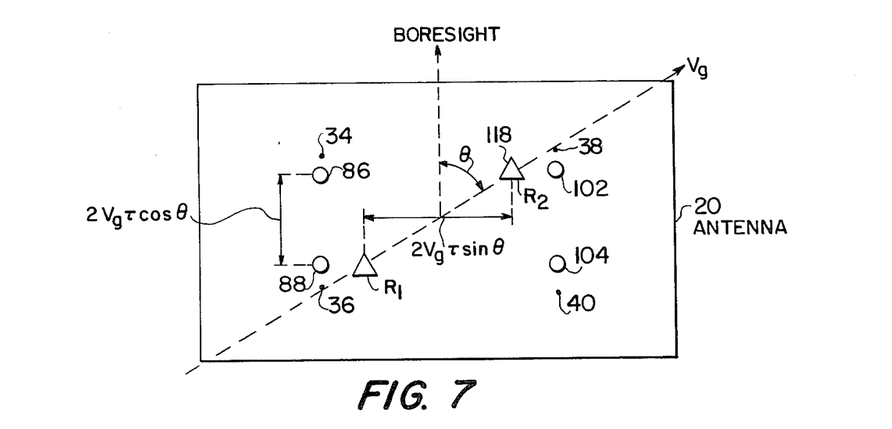

Referring now to FIG. 6, the digital processor 72 forms the two receive beams $R_1$ and $R_2$ as follows: The signals from the forward-port sub-array FP and from the aftport sub-array AP are multiplied by $(1-k_l)$ and $(1+k_l)$ at multipliers 75 and 76, respectively, and are combined in an adder 78. These some signals from sub-arrays FP and AP are also multiplied by $(1+k_l)$ and $(1-k_l)$ at multipliers 80 and 82, respectively, and combined in an adder 84. The output of adders 78 and 84 are equivalent to signals from receive beams having their phase centers located at circles 86 and 88, respectively which are separated by $2V_g\tau\cos\theta$ as shown in FIG. 7.

In a similar manner, the signals from the forward-starboard sub-array FS and the aft-starboard sub-array AS are multiplied by $(1-k_l)$ and $(1+k_l)$ at multipliers 90 and 92, respectively, and combined in adder 94, and also multiplied by $(1+k_l)$ and $(1-k_l)$ at multipliers 96 and 98, and combined in an adder 100. The output of adders 94 and 100 are equivalent to signals from receive beams having their phase centers located at circles 102 and 104, respectively, which are separated by $2V_g\tau\cos\theta$ as shown in FIG. 7.

The output of adder 78 and 94 are multiplied by $(1-k_t)$ and $(1+k_t)$ at multipliers 106 and 108, respectively, and combined in an adder 110.

In a similar manner the output of adder 84 and 100 are multiplied by $(1+k_t)$ and $(1-k_t)$ at multipliers 112 and 114, respectively, and combined in an adder 116. The outputs of adder 116 and adder 110 are equivalent to signals from receive beams having phase centers located at triangles 118 and 120, respectively, which are separated by $2V_g\tau\cos\theta$ in the longitudinal and $2V_g\tau\sin\theta$ in the transverse direction as shown in FIG. 7. These signals are equivalent to signals from the two receive beams $R_1$ and $R_2$ having the proper separation for cancellation of fixed targets.

For values of angle $\theta$ between $-90°$ and $+90°$ ($\theta$ is the angle between the boresight direction and the aircraft velocity vector), the output of adder 116 is delayed at 122 for an interpulse period $\tau$ and is subtracted from the output of adder 110 at subtractor 124 to cancel fixed targets. (For $90° < \theta < 270°$, the output of adder 110 is delayed and subtracted from the output of adder 116.) The output of subtractor 124 which includes only signals from moving targets is fed via the digital-to-analog converter 73 to the indicator 74 for display.

From consideration of the operation of digital processor 72, it can be seen that the output of adders 110 and 116 (receive beams R1 and R2) are equivalent to signals from two antennas A1 and A2 where A1 =
  FP $(1+k_t)(1+k_l)$
  + FS $(1-k_t)(1+k_l)$
  + AP $(1+k_t)(1-k_l)$
  + AS $(1-k_t)(1-k_l)$
and
A2 =
  FP $(1-k_t)(1-k_l)$
  + FS $(1+k_t)(1-k_l)$
  + FS $(1-k_t)(1+k_l)$
  + AS $(1+k_t)(1+k_l)$ Thus digital processor 72 effectively forms two virtual antennas separated by the proper distances. Clutter may be cancelled by delaying the signals received at the more forward (relative to the aircraft's velocity vector—A1 will be more forward for $-90° < \theta > +90°$; A2 will be more forward for $90° < \theta > 270°$) of A1 or A2 for an interpulse period, and subtracting the delayed signals from those received at the more aft antenna.

It will be apparent to a person skilled in the art of motion compensation that the functions of digital processor 72 may be accomplished through the use of analog sum and difference channels to shift the phase centers of the receive beams in the manner required by the present invention. For example, the output of IF amplifier 48 (receive beam FP) and the output of IF amplifier 50 (receive beam AP) may be input to an hybrid amplifier which forms the sum and difference of its inputs. The difference output may then be added to or subtracted from the sum output to effectively shift the apparent phase center of the sum output. This same precess may then be repeated until beams with phase centers separated by the desired amount are formed.

Obviously, many modifications and variations of the present invention are possible in light of the above teachings. It is therefore to be understood that within the scope of the appended claims, the invention may be practiced otherwise than as described.

What is claimed and desired to be secured by letters patent of the United States is:

1. An antenna system for use with a pulse-type airborne moving-target-indication radar system comprising:

means for producing a first receive beam FP, a second receive beam AP, a third receive beam FS, and a fourth receive beam AS, the lines of center of said first receive beam FP, said second receive beam AP, said third receive beam FS, and said fourth receive beam AS being parallel, the lines of center of said first receive beam FP and said second receive beam AP being coincident, the lines of center of said third receive beam FS and said fourth receive beam AS being coincident, the lines of center of said first receive beam FP and said second receive beam AP being separated from the lines of center of said third receive beam FS and said fourth receive beam AS, the phase center of said first receive beam FP being forward of the phase center of said second receive beam AP, and the phase center of said third receive beam FS being forward of the phase center of said fourth receive beam AS:

means for varying the phase centers of said first receive beam FP and said second receive beam AP to effectively provide a new first receive beam and a new second receive beam;

means for varying the phase centers of said third receive beam FS and said fourth receive beam AS to effectively provide a new third receive beam and a new fourth receive beam;

means for combining said new first receive beam and said new third receive beam to provide a resultant receive beam $R_2$; and means for combining said new second receive beam and said new fourth receive beam to provide a resultant receive beam $R_1$.

2. The antenna system as recited in claim 1 wherein the means for varying the phase centers of said first receive beam FP and said second receive beam AP comprises:

means for multiplying signals received by said first receive beam FP and said second receive beam AP by $1-k_l$ and $1+k_l$, respectively, where $k_l$ is related to the velocity of the aircraft in said centerline direction and to the interpulse period and adding the resulting signals to form said new first receive beam; and means for multiplying signals received by said second receive beam AP and said first receive beam FP by $1-k_l$ and $1+k_l$, respectively, and adding the resulting signals to form said new second receive beam; and wherein the means for varying the phase centers of said third receive beam FS and said fourth receive beam AF comprises;

means for multiplying signals received by said third receive beam FS and said fourth receive beam AS by $1-k_l$ and $1+k_l$, respectively, and adding the resulting signals to form said new third receive beam; and means for multiplying signals received by said fourth receive beam AS and said third receive beam FS by $1-k_l$ and $1+k_l$, respectively, and adding the resulting signals to form said new fourth receive beam.

3. The antenna system as recited in claim 2 wherein the means for combining said new first receive beam and said new third receive beam comprises:

means for multiplying said new first receive beam and said new third receive beam by $1-k_t$ and $1+k_t$, respectively, where $K_t$ is related to the velocity of the aircraft in the direction normal to said centerline direction and to the interpulse period and adding the resulting signals to provide the resultant receive beam $R_2$; and wherein the means for combining said new second receive beam and said new fourth receive beam comprises;

means for multiplying said new second receive beam and said new fourth receive beam by $1+k_t$ and $1-k_t$, respectively, and adding the resulting signals to provide the resultant receive beam $R_1$.

4. In an airborne radar system of the type wherein search pulses are periodically indicated in a directional beam, a system for compensating for the effects of relative motion between the radar system and fixed targets comprising:

means for producing two pairs of directive reception patterns having parallel lines of center, the first pair of said directive reception patterns having coincident centerlines and having phase centers displaced from each other, the second pair of said directive reception patterns having coincident centerlines and having phase centers displaced from each other, the lines of center of said first and second pairs of directive reception patterns being spaced apart, the phase centers of said two pairs of reception patterns defining a horizonal plane;

means for varying the phase centers of said two pairs of directive reception patterns to provide two resultant reception patterns having effective phase centers separated by twice the distance the aircraft moves in an interpulse period in both the direction of maximum radiation sensitivity of said reception patterns and the direction normal to said direction;

means for delaying a signal received on one of said resultant reception patterns for an interpulse period; and means for subtracting said delayed signal from a signal from the other of said resultant reception patterns to provide a signal in which returns from fixed objects have been cancelled.

5. An antenna system for use with a pulse-type airborne moving-target-indication radar system comprising:

$n$ parallel arrays of m radiation reception elements, said radiation reception elements in each array being phased so as to produce a direction of maximum radiation sensitivity along the line of each of said arrays, the radiation reception elements in each array being grouped to form $n$ formed sub-arrays and $n$ aft sub-arrays, the phase centers of the forward sub-arrays being located ahead of the phase centers of the aft sub-arrays in the direction of maximum radiation sensitivity, said n forward sub-arrays being grouped to form a forward-port sub-array and a forward-starboard sub-array which overlap in a plane normal to the direction of maximum radiation sensitivity, said n aft sub-arrays being grouped into an aft-port sub-array and an aft-starboard sub-array which overlap in a plane normal to the direction of maximum radiation sensitivity;

means for forming first, second, third and fourth receive beams from the signals received in said forward-port sub-array, said aft-port sub-array, said forward-starboard sub-array, and said aft-starboard sub-array, respectively; and means for varying the phase centers of said four receive beams to provide two resultant receive beams having effective phase centers separated by twice the distance the aircraft moves in an interpulse period in both the direction of maximum radiation sensitivity and the direction normal to this direction.

6. The antenna system of claim 4 wherein the means for varying the phase centers of said first, second, third, and fourth receive beam comprises:

means for multiplying signals received in said first receive beam and said second receive beam by $1-k_l$ and $1+k_l$, respectively, where $k_l$ is related to the velocity of the aircraft in the direction of maximum radiation sensitivity and to the interpulse period and adding the resulting signals to effectively form a new first receive beam; and means for multiplying signals received in said second receive beam and said first receive beam by $1-k_l$ and $1+k_l$, respectively, and adding the resulting signals to effectively form a new second receive beam;

means for multiplying signals received in said third receive beam and said fourth receive beam by $1-k_l$ and $1+k_l$, respectively, and adding the resulting signals to effectively form a new third receive beam;

means for multiplying signals received in said fourth receive beam and said third receive beam by $1-k_l$ and $1+k_l$, respectively, and adding the resulting signals to effectively form a new fourth receive beam; and means for multiplying said new first receive beam and said new third receive beam by $1-k_l$ and $1+k_l$, respectively, where $k_l$ is related to the velocity of the aircraft in the direction normal to the direction of maximum radiation sensitivity and to the interpulse period and adding the resulting signals to provide one of said resultant receive beams; and means for multiplying said new second receive beam and said new fourth receive beam by $1+k_l$ and $1-k_l$, respectively, and adding the resulting signals to provide the other of said resultant receive beams.

7. In an airborne radar system of the moving-target-indicator typw wherein search pulses are periodically radiated in a directional beam, a system for compensating for the effects or relative motion between the radar system and fixed targets comprising:

an antenna system comprising $n$ parallel arrays of m radiation reception elements, said radiation reception elements in each array being phased so as to produce a direction of maximum radiation sensitivity along the line of each of said arrays, the radiation reception elements in each array being grouped to form $n$ forward sub-arrays and $n$ aft sub-arrays, the phase centers of the forward sub-arrays being located ahead of the phase centers of the aft sub-arrays in the direction of maximum radiation sensitivity, said n forward sub-arrays being grouped to form a forward-port sub-array and a forward-starboard sub-array which overlap in a plane normal to the direction of maximum radiation sensitivity, said $n$ aft sub-arrays being grouped into a aft-port sub-array and aft-starboard sub-array which overlap in a plane normal to the direction of maximum radiation sensitivity;

means for forming first, second, third and fourth receive beams from the signals received in said forward-port sub-array, said aft-port, sub-array said forward-starboard sub-array, and said aft-starboard sub-array, respectively; and means for varying the phase centers of said four receive beams to provide two resultant receive beams having effective phase centers separated by twice the distance the aircraft moves in a interpulse period in both the direction of maximum radiation sensitivity and the direction normal to this direction, means for delaying a signal received in one of said resultant receive beams for an interpulse period;

means for subtracting said delayed signal from a signal from the other of said resultant receive beams to provide a signal in which returns from fixed objects have been cancelled.

8. The system as receited in claim 6 wherein said means of varying the phase centers of said four receive beams comprises:

means for multiplying signals received in said first receive beams and said second receive beam by $1-k_l$ and $1+k_l$, respectively, where $k_l$ is related to the velocity of the aircraft in the direction of maximum radiation sensitivity and to the interpulse period and adding the resulting signals to effectively form a new first receive beam; and means for multiplying signals received in said second receive beam and said first receive beam by $1-k_l$ and $1+k_l$, respectively, and adding the resulting signals to effectively form a new second receive beam;

means for multiplying signals received in said third receive beam and said fourth receive beam by $1-k_l$ and $1+k_l$, respectively, and adding the resulting signals to effectively form a new third receive beam;

means for multiplying signals received in said fourth receive beam and said third receive beam by $1-k_l$ and $1+k_b$, respectively, and adding the resulting signals to effectively form a new fourth receive beam; and means for multiplying said new first receive beam and said new third receive beam by $1-k_t$ and $1+k_t$, respectively, where $k_t$ is related to the velocity of the aircraft in the direction normal to the direction of maximum radiation sensitivity and to the interpulse period and adding the resulting signals to provide one of said resultant receive beams; and means for multiplying said new second receive beam and said new fourth receive beam by $1+k_t$ and $1-k_t$, respectively, and adding the resulting signals to provide the other of said resultant receive beams.

9. An antenna system for use with a pulse-type airborne moving-target-indication radar system comprising:

an antenna system comprising n parallel arrays of $m$ radiation reception elements, said radiation reception elements in each array being phased so as to produce a direction of maximum radiation sensitivity along the line of each of said arrays, the radiation reception elements in each array being grouped to form $n$ forward sub-arrays and $n$ aft sub-arrays, the phase centers of the forward sub-arrays being located ahead of the phase centers of the aft-sub-arrays in the direction of maximum radiation sensitivity, said n forward sub-arrays being grouped to form a forward-port sub-array and a forward-starboard sub-array which overlap in a plane normal to the direction of maximum radiation sensitivity, said $n$ aft sub-arrays being grouped into a aft-port sub-array and aft-starboard sub-array which overlap in a plane normal to the direction of maximum radiation sensitivity; and means for forming FP, AP, FA and AS receive beams from the signals received in said forward-port sub-array, said aft-port sub-array, said forward-starboard sub-array, and said aft-starboard sub-array, respectively; and means for combining the signals from said receive beams to form a first virtual antenna A1 and a second visual antenna A2, said virtual antennas being separated by twice the distance the aircraft moves in an interpulse period and lying along a line parallel to the ground track of the aircraft.

10. The antenna system as recited in claim 9 wherein said first virtual antenna A1 is defined by A1 =
FP $(1+k_t)(1+k_l)$
+FS $(1-k_t)(1+k_l)$
+AP $(1+k_t)(1-k_l)$
+AS $(1-k_t)(1-k_l)$ and said second virtual antenna is defined by A2 =
FP $(1-k_t)(1-k_l)$
+FS $(1+k_t)(1-k_l)$
+AP $(1-k_t)(1+k_l)$
+AS $(1+k_t)(1+k_l)$ where $k_l$ is related to the velocity of the aircraft in the boresight direction and to the interpulse period and $k_t$ is related to the velocity of the aircraft in the direction normal to the boresight direction and to the interpulse period.

11. The antenna system as recited in claim 9 wherein said first virtual antenna A1 is defined by A1 =
FP $(1-k_t)(1+k_l)$
+FS $(1-k_t)(1+k_l)$
+AP $(1+k_t)(1-k_l)$
+AS $(1-k_t)(1-k_l)$ and said second virtual antenna is defined by A2 =
FP $(1-k_t)(1-k_l)$
+FA $(1+k_t)(1-k_l)$
+AP $(1-k_t)(1+k_l)$
+AS $(1+k_t)(1+k_l)$ where $k_l$ is related to the velocity of the aircraft in the direction of maximum radiation sensitivity and to the interpulse period and $k_t$ is related to the velocity of the aircraft in the direction normal to said direction of maximum radiation sensitivity and to the interpulse period.

* * * * *